US012639657B2

(12) United States Patent
Jantzi et al.

(10) Patent No.: US 12,639,657 B2
(45) Date of Patent: May 26, 2026

(54) OCEAN-TRAVEL CONFIGURATION OF ASSET TRACKING DEVICES

(71) Applicant: BlackBerry Limited, Waterloo (CA)

(72) Inventors: Jason Wayne Jantzi, St. Clements (CA); Mark Edward Reaume, Waterloo (CA); Yu Gao, Waterloo (CA); Scott Leonard Dill, Paris (CA); Ryan Michael Parker, Ottawa (CA); Steven Joseph Macdonald, Waterloo (CA); Mahendra Fuleshwar Prasad, Waterloo (CA)

(73) Assignee: BlackBerry Limited, Waterloo (CA)

( * ) Notice: Subject to any disclaimer, the term of this patent is extended or adjusted under 35 U.S.C. 154(b) by 279 days.

(21) Appl. No.: 18/175,984

(22) Filed: Feb. 28, 2023

(65) Prior Publication Data

US 2024/0289728 A1 Aug. 29, 2024

(51) Int. Cl.
| | |
|---|---|
| *G06Q 10/0833* | (2023.01) |
| *G01S 1/04* | (2006.01) |
| *G01S 19/23* | (2010.01) |
| *G01S 19/34* | (2010.01) |
| *G06Q 10/0831* | (2023.01) |
| *H04W 88/10* | (2009.01) |

(52) U.S. Cl.
CPC .......... *G06Q 10/0833* (2013.01); *G01S 1/045* (2013.01); *G01S 19/23* (2013.01); *G01S 19/34* (2013.01); *G06Q 10/0831* (2013.01); *H04W 88/10* (2013.01)

(58) Field of Classification Search
None
See application file for complete search history.

(56) References Cited

U.S. PATENT DOCUMENTS

| | | | | |
|---|---|---|---|---|
| 7,072,668 B2 * | 7/2006 | Chou | ...................... | G01S 19/48 |
| | | | | 455/461 |
| 7,378,960 B1 * | 5/2008 | Binding | ................. | G06Q 10/08 |
| | | | | 340/3.6 |
| 8,294,573 B2 * | 10/2012 | Mermet | ................ | G01S 5/0027 |
| | | | | 340/539.3 |
| 9,716,517 B1 * | 7/2017 | Kumar | ..................... | H02H 3/38 |

(Continued)

FOREIGN PATENT DOCUMENTS

CN 107063199 A * 8/2017 ............. G01S 19/43

OTHER PUBLICATIONS

ZigBee Cluster Library User Guide 2015 (Year: 2015).*

*Primary Examiner* — Redhwan K Mawari
*Assistant Examiner* — Kai Wang
(74) *Attorney, Agent, or Firm* — Conley Rose, P.C.; J. Robert Brown, Jr.

(57) ABSTRACT

Methods and systems for controlling an asset tracking device and, in particular, determining when an asset tracking device is aboard a ship. The device may have a ship mode in which the device determines it has been loaded onto a ship and in which geolocation is not determined. The device may further have an ocean mode to which it transitions from the ship mode in which it ceases to look for a cellular connection in order to send location reports. The device may detect a beacon signal from a ship-mounted base-station to trigger the ship mode and may detect, or fail to detect, one or more wireless signals or identifiers as the trigger to transition to ocean mode.

24 Claims, 5 Drawing Sheets

(56) References Cited

U.S. PATENT DOCUMENTS

| | | | |
|---|---|---|---|
| 10,368,204 B2 * | 7/2019 | Nogueira-Nine | G01S 5/0027 |
| 10,495,764 B2 * | 12/2019 | Bastian, II | G06Q 10/08 |
| 10,795,429 B2 * | 10/2020 | Ayoub | H04W 4/029 |
| 2010/0149028 A1 * | 6/2010 | Mermet | G01S 19/14 |
| | | | 342/357.31 |
| 2012/0008595 A1 * | 1/2012 | Wang | H04W 36/385 |
| | | | 370/331 |
| 2012/0252485 A1 * | 10/2012 | Wolverton | G01S 5/019 |
| | | | 455/456.1 |
| 2017/0355458 A1 * | 12/2017 | Chen | G05D 1/0858 |
| 2020/0160009 A1 * | 5/2020 | Vatn | G06K 7/10128 |
| 2021/0311203 A1 * | 10/2021 | Reis | G01S 19/21 |
| 2022/0276061 A1 | 9/2022 | Viitala | |
| 2022/0404383 A1 | 12/2022 | Kvapil | |

* cited by examiner

OCEAN-TRAVEL CONFIGURATION OF ASSET TRACKING DEVICES

FIELD

The present application generally relates to global asset tracking devices and the challenges presented by dead zones or low-quality network coverage in some geographical areas.

BACKGROUND

Asset tracking devices may be attached to shipping containers, train cars, truck frames, or other items for which a user wishes to track geographical locations. The asset tracking devices typically obtain location data using satellite signals, if available. If the device is unable to obtain a satellite signal, it may attempt to listen for cellular tower signals in order to determine its location using cellular triangulation, or other such methods. In some cases, it may listen for WLAN signals or other such signals to try to determine location. The devices then periodically obtain a data connection over a cellular network and transmit a location report to a central server. A registered user account having one or more associated tracking devices may enable a user to log into the central server to obtain information regarding the location or location history of their associated tracking devices.

When attached to a shipping container, the asset tracking device may, on occasion, be put on an ocean-going vessel. While at sea, the device is typically unable to obtain a data connection due to the lack of any cellular coverage. In many cases, whether in a ship's hold, or when buried in a stack of container on deck, the device may also be unable to obtain sufficient satellite signals to determine its location.

Asset tracking devices, particularly those mounted to intermodal containers, are typically battery powered and need to be designed in such a way that they do not waste power unnecessarily.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
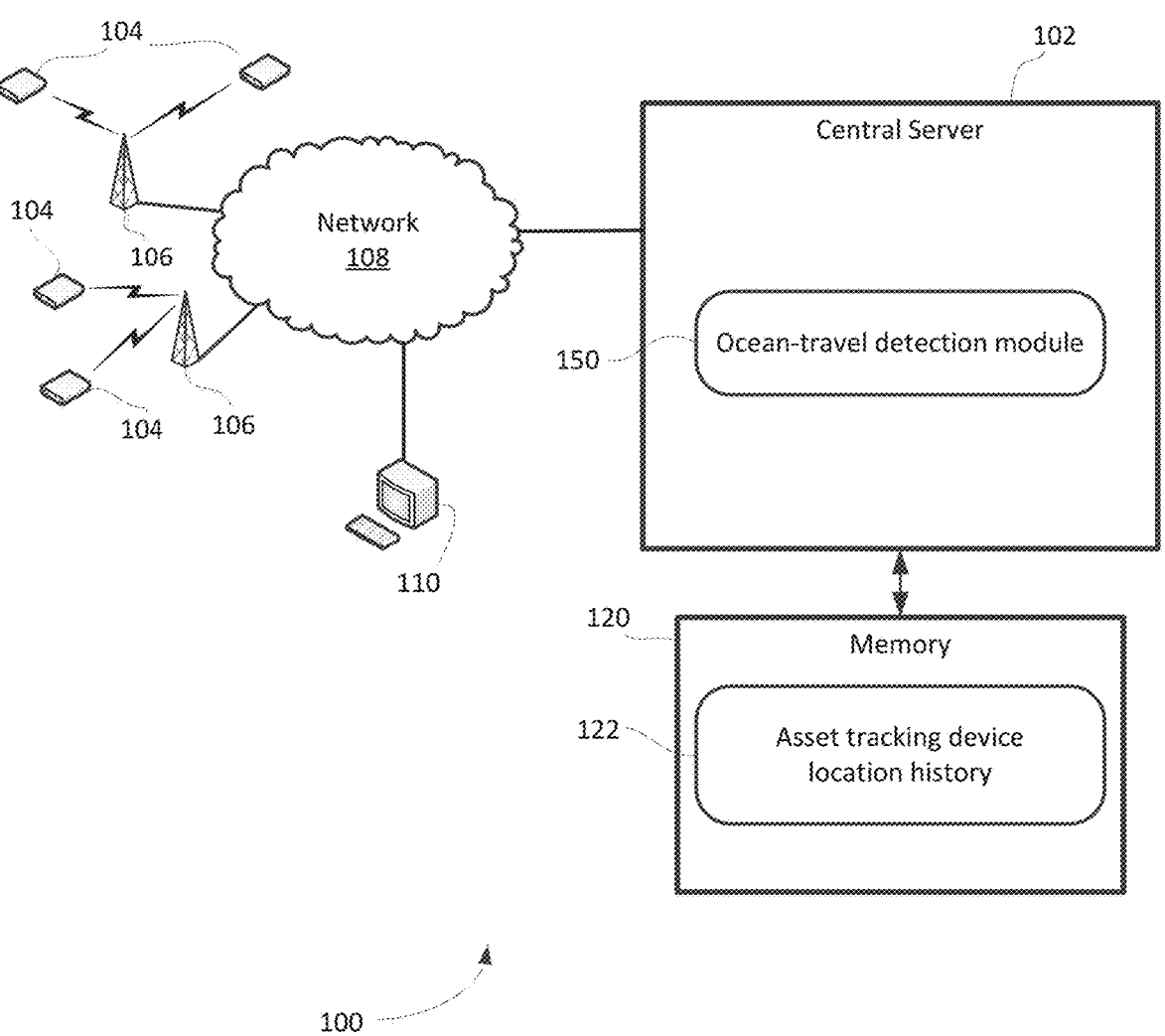
FIG. 1 shows an example system for communicating with and monitoring a set of asset tracking devices.

In a first aspect, the present application describes a computer-implemented method of operating an asset tracking device. The method may include detecting, at the asset tracking device, using a short-range communication system, a beacon signal broadcast by a base station on a ship; in response to detecting the beacon signal, entering a ship mode in which the asset tracking device does not determine its location using a global navigation satellite system (GNSS) chip; and determining, based on one or more wireless signals, that the ship is at sea and, in response to determining that the ship is at sea, entering an ocean mode in which the asset tracking device does not determine its location using the GNSS chip, and does not power a cellular transceiver to seek a mobile network connection.

In some implementations, the beacon signal includes an identifier and detecting includes comparing the identifier to stored data listing ship-borne beacon identifiers and locating a match.

In some implementations, detecting the beacon signal includes determining that a received signal strength intensity of the beacon signal is above a minimum threshold level.

In some implementations, the one or more wireless signals include the beacon signal, and determining that the ship is at sea is based on data in the beacon signal.

In some implementations, the method may further include detecting a real-time kinematics (RTK) correction signal using an RTK receiver, and causing the asset tracking device to use the short-range communication system to look for the beacon signal after detection of the RTK correction signal.

In some implementations, determining that the ship is at sea includes determining that the RTK receiver no longer detects the RTK correction signal.

In some implementations, detecting the RTK correction signal includes decoding the RTK correction signal to obtain an RTK base-station identifier, and matching the RTK base-station identifier to an identifier in a set of port-associated RTK base-station identifiers.

In some implementations, the method may further include, after entering the ocean mode, during a subsequent wake-up time: detecting the beacon signal using the short-range communication system; detecting a new RTK correction signal using the RTK receiver; and in response to the new RTK signal, switching from the ocean mode to the ship mode. In some cases, the method may further include, during a further wake up time, attempting and failing to detect the beacon signal using the short-range communication system and, in response, switching the device from the ship mode to a normal mode of operation in which the device uses the GNSS chip to determine its location.

In some implementations, the one or more wireless signals include cellular tower signals and determining that the ship is at sea includes determining that the device cannot detect any cellular tower signals using the cellular transceiver.

In some implementations, the method may further include first using the GNSS chip to determine a geolocation for the device, determining that geolocation matches a geofence defined for a port area and, in response, causing the device to use the short-range communication system for detecting the beacon signal.

In another aspect, the present application provides an asset tracking device, including a short-range communication system; a global navigation satellite system (GNSS) chip; a cellular transceiver; a controller; and a memory storing processor executable instructions. When executed by the controller, the instructions may cause the controller to detect, using the short-range communication system, a beacon signal broadcast by a base station on a ship; in response to detecting the beacon signal, enter a ship mode in which the asset tracking device does not determine its location using the GNSS chip; and determine, based on one or more wireless signals, that the ship is at sea and, in response to determining that the ship is at sea, enter an ocean mode in which the asset tracking device does not determine its location using the GNSS chip, and does not power the cellular transceiver to seek a mobile network connection.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to asset tracking devices. These devices may be attached to shipping containers, train cars, truck frames, or other items for which a user wishes to track geographical location. Asset tracking devices typically contain a global navigation satellite system (GNSS) chip or other such hardware for obtaining location data using satellite signals. In some cases, the devices may be configured to use cellular triangulation, WiFi location determination, short range beacon location data, or other such location technologies, for example in the cases where GNSS signals cannot be obtained, such as indoors or when an object or geography blocks the device's ability to obtain the requisite number of satellite signals.

Asset tracking devices typically contain a cellular transceiver that enables them to periodically obtain a data connection over a cellular network and transmit a location report to a central server. The location report may contain one or more geolocation determinations or geolocation data, timestamps for when the data was obtained, and other such information. The central server may provide an interface that enables a registered user account having one or more associated tracking devices to log into the central server to obtain reported information regarding the location or location history of their associated tracking devices.

FIG. 1 shows an example system 100 for asset tracking. The system 100 may include central server 102 and a plurality of asset tracking devices 104 deployed in various locations. The devices 104 may be in one country or many countries, and may be attached to various items, such as tractor trailers, shipping containers, train chassis, truck chassis, shipping pallets, and the like. The devices 104 may include one or more inertial measurement units (IMUs) for determining if the device 104 is stationary or in motion, such as an accelerometer. The devices 104 may include one or more geolocation determination devices, such as a GNSS chip. The devices 104 may also include a cellular transceiver that enables them to receive signals from one or more nearby cellular towers 106 forming part of a mobile data network. The mobile data networks are interconnected with other data networks, such as the Internet in a computer network 108 to provide for worldwide data connectivity and communications capability. The devices 104 are thus able to send and receive data with the central server 102 from any location in the world in which they are able to obtain a cellular data connection through a mobile data network. In some cases, the devices 104 may also include a WLAN chip, such as a WiFi chip set, that enables shorter-range wireless communications access to the computer network 108.

The devices 104 may be configured to operate in a low power mode most of the time to conserve battery power, given that they may be deployed in the field for many years at a time. In some implementations, the devices 104 may be configured to awaken from a low power state periodically to obtain location data and to report location data to the central server 102. In some cases, the periodicity may vary depending on whether the device 104 is in motion or stationary. For example, if the device 104 determines, from its IMU that it is not in motion and/or from a comparison of current location data to previous location data that it has not moved, then it may set a longer period of time before its next awakening, such as every 30 minutes, hour, 2 hours, 6 hours, etc. If the device 104 determines, from the IMU and/or from the location data, that it is in motion then it may set a shorter time period, such as 5 minutes, 10 minutes, 15 minutes, etc.

The periodicity with which the device 104 seeks a cellular data connection and sends a location report may be the same or may be different from the periodicity with which the device 104 awakens and obtains location data. In some cases, the reporting may occur less frequently than the location data recordings, particularly if the device 104 is in motion. For instance, if the device obtains location data every 5 minutes, it may be configured to only report the accumulated location data and timestamps every 30 or 60 minutes, to save power.

In some cases, when the device 104 seeks network connectivity via its cellular transceiver it may fail to locate a cellular tower 106 with which it can establish a connection. In such situations, the device 104 may be in a 'dead-zone' with respect to the mobile network operator with which it is configured to operate. The owner or operator of the device 104 may therefore not receive an expected location report from the asset tracking device 104 for as long as the device 104 is in a geographic area in which cellular connectivity is unavailable. This can be for long periods of time in some cases, such as when the device 104 is on a ship, or if the device 104 is stationary in a "dead-zone", e.g. located in a container yard or the like with poor or no cellular coverage.

Owners or operators of the asset tracking devices 104 may each have an associated user account with the central server 102 that enables them to remotely log into, or otherwise connect with, the central server 102, such as through an API via a mobile application or using other such technology. By way of a user device 110, the user may send and receive communications with the central server 102 regarding one or more of the asset tracking devices 104 associated with the user account, including receiving data regarding the reported location of the asset tracking devices 104. It will be understood that various authentication and verification processes may be imposed by the central server 102 to ensure that data regarding one of the devices 104 is only provided to an authorized user account with which the device 104 is associated.

The central server 102 may provide data, including geographical location data, to the user device 110 that enables the user device 110 to output a graphical user interface showing, as an overly atop of a map rendering, the location of one of the devices 104. The overlay may include a symbol or marker rendered at the location in the GUI atop the map corresponding to the geographical location last reported by the device 104 in its location reports. In some cases, additional information may be made available for display on the client device 110 by the central server 102. Location reports may include information such as latitude and longitude coordinates and data obtain by the device 104 from cellular tower signals that it is able to receive. The cellular data may include, for example, cellular tower identifier (i.e. Cell ID or CID), Radio Access Technology (RAT) such as GSM, UMTS, LTE, 5G, etc., cellular band, RSSI readings, mobile country code (MCC), Mobile Network Code (MNC), mobile network operator (MNO) identifier, location area code (LAC), and other such data.

In some implementations, the device 104 may include other sensors, such as a temperature sensor, humidity sensor, vibration sensor, or other environmental sensors. That sensor data may be included in one or more of the location reports. In some cases, one or more sensors or other instruments may be contained in different physical unit from the device 104 and may communicate with the device using a low-power short range communication protocol, such as Bluetooth™ for example.

Figure 2:
FIG. 2 illustrates in block diagram form, a simplified example of an asset tracking device.
Figure 2:
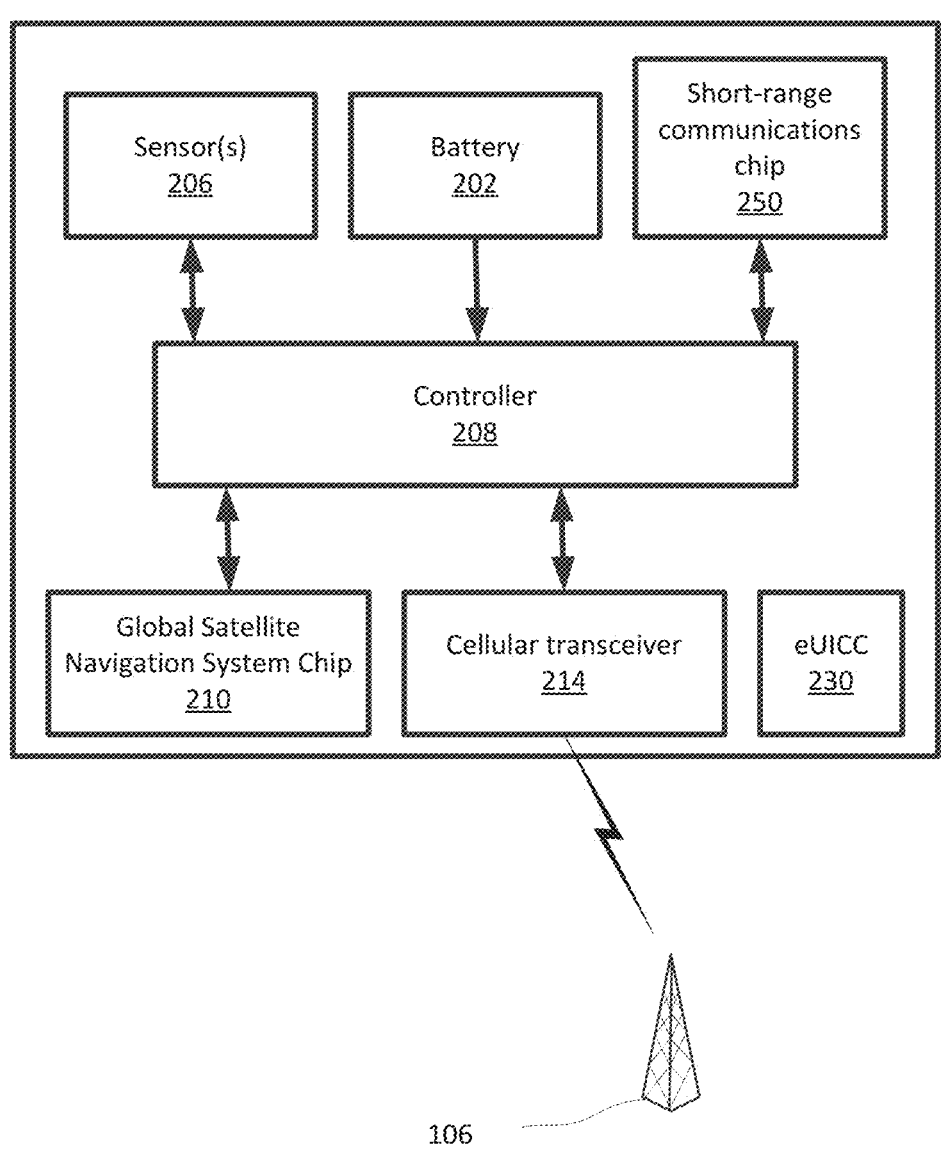

Reference is now also made to FIG. 2, which shows, in block diagram form, one simplified example of the asset tracking device 104. The device 104 may include one or more batteries 202 to power the device 104. Battery 202 may be rechargeable or replaceable in some implementations, and the device 104 may further include battery charging circuitry (not shown) to receive charge from an external power source.

The asset tracking device 104 in this example contains one or more sensors 206, a controller 208, a GNSS chip 210, a cellular signal transceiver 214, and a short-range communication system, which in this example is a short-range communications chip 250. The one or more sensors 206 may include environmental sensors, such as IMUs, temperature sensors, humidity sensors, dust sensors, chemical sensors, etc. In some cases, the one or more sensors 206 may include load-detection sensors for determining whether a container is loaded on a chassis or the quantity of a load on a chassis. Load-detection sensors may include a millimeter wave radar sensor, a range detector, strain gauge, switch, laser, Hall effect sensor, Time-of-Flight sensor, Reid switch, etc.

The controller 208 may, in some embodiments, be a microprocessor that may be coupled to memory (not pictured). In some cases, the controller 208 may be a microcontroller, an application-specific integrated circuit (ASIC), or another such processing unit. The controller 208 may include a timer and may be configured to awaken from a lower-power state based on the timer. The controller 208 may be configured to determine when to power up the GNSS chip 210 and/or cellular signal transceiver 214, and to obtain and store in memory location data and other data from either the GNSS chip 210 or the cellular signal transceiver 214. The controller 208 may control the cellular signal transceiver 214 and cause it to obtain a data connection with a cellular tower 106 to connect to a mobile network and to send and receive data with the central server (not shown).

The GNSS chip 210 receives location data from a plurality of satellites. The GNSS chip 210 may operate in accordance with one or more satellite location determination protocols, such as the Global Positioning System (GPS), Global Navigation Satellite System (GLONASS), BeiDou Navigation Satellite System, Galileo Satellite Navigation System, Indian Regional Navigation Satellite System (IRNSS)/NavIC, or others. The GNSS chip 210 may be configured to determine, based on received satellite signals from three or more satellites, and output a set of geographic coordinates representing the geolocation of the device 104.

In some implementations, the GNSS chip 210 may include a Real-Time Kinematics (RTK) receiver. An RTK receiver is configured to receive a correction signal broadcast by an RTK base station. The RTK correction signal is typically formatted using a Radio Technical Commission for Maritime (RTCM) protocol. The correction signal can be used by the GNSS chip 210 to improve the location accuracy normally achievable with satellite signals, from an accuracy of meters to an accuracy of centimeters. In some implementations, the device 104 may include an RTK receiver (not illustrated) separate from the GNSS chip 210.

The cellular signal transceiver 214 receives data from signals broadcast by a plurality of cellular signal towers 106. This data may include cellular tower identifiers, mobile network identifiers, mobile operator identifiers, timestamps, received signal strength measurements, and other such data. The device 104 or the central server (not shown) may be configured to determine a geolocation from the data using cellular triangulation.

The short-range communications chip 250 may include one or more short-range communications technologies, such as WiFi, Bluetooth™, low-power wide-area network (LP-WAN) technology, or other such technologies. In some cases, the short-range communications chip 250 may be used by the device 104 to connect with and exchange communications with a nearby sensor unit or other peripheral related to the asset tracking device 104. In the examples described below, the short-range communications chip 250 may be used to receive and detect a beacon signal broadcast by a base station.

The geolocation data, cellular data, sensor data, and other data collected by the controller 208 during a wakeful period may be saved in memory on the device 104 together with a timestamp. The controller 208 may then cause the systems of the device 104 to reenter a sleep or low power mode until next triggered by the timer and/or the IMU. When the controller 208 determines that a location report is to be sent to the central server, it may cause the cellular signal transceiver 214 to establish a wireless data connection with a mobile network, and to transmit a message to the central server containing the location report that include stored data, such as geolocation data, cellular data, sensor data, and other data.

Referring still to FIG. 1 and FIG. 2, the central server 102 may include memory 120 that stores data relating to the asset tracking devices 104. The memory 120 may further store data regarding user accounts and related authentication data and associations between user accounts and specific asset tracking devices 104. The location reports periodically received, or the data in those reports, may be stored in the memory 120 as asset tracking device location history 122. The asset tracking device location history 122 may include, for each asset tracking device 104 its associated geolocation at timestamps throughout its time in deployment. In some implementations, the memory 120 may only store a certain number or time period of most recent geolocation data so as to avoid excessive memory consumption, such as the past six or twelve months, for instance.

The asset tracking device 104, in some embodiments, may include an eSIM or eUICC 230 (embedded universal integrated circuit card) configured to permit the storage of more than one network profile and the remote provisioning of a network profile (e.g. mobile network credentials) in an over-the-air wireless provisioning operation. The eUICC 230 provides the cellular signal transceiver 214 with the network credentials for enabling establishment of a data connection with a particular mobile network operator. The credentials are associated with a mobile network plan governing the access to which the device 104 is entitled to the mobile network and the billing plan associated with network communications by the device 104.

Asset Tracking Devices and Ocean Travel

As noted above, almost any mobile network operator (MNO) may have gaps in its coverage area for a geographic region. When an asset tracking device enters an area in which it cannot obtain a cellular data connection, it is unable to provide a location report to the central server. One area in which devices typically cannot obtain cellular service is when on an ocean-going ship. Because containers may be loaded onto a ship and travel the ocean for long periods of time, the asset tracking device may spend days or even weeks without the ability to obtain a cellular connection and, in many instances, without the ability to obtain satellite signals. As also mentioned above, when loaded onto a ship an intermodal container may be put into a cargo hold or may be stacked on the deck of the ship. Due to the tight stacking of containers, all but the outermost containers will typically be unable to receive sufficient satellite signals to determine a location using their GNSS chips.

Accordingly, when on the ocean, asset tracking devices may waste significant battery power in trying to determine their location and trying to establish a cellular connection under conditions in which the location likely cannot be determined and, even if it is, it cannot be reported to the central server. Some existing systems attempt to determine if a tracking device is on a ship using a plurality of inertial movement sensors, calculating motion, and attempting to correlate the calculated motion to the expected movement of an ocean-going vessel. Such system may rely on detecting wave activity or other ocean-specific motion and may fail to properly identify ocean travel if that type of motion is undetected or erroneously detected in other contexts. In some cases, IMU's may give a false indication of vehicular motion, prompting the device to engage in more frequent attempts to determine location or to seek a cellular connection. Such systems may expend significant battery power in the ocean movement detection process.

In accordance with one aspect, the present application describes devices and methods of determining that an asset tracking device is on board a ship, causing the device to enter a ship mode, and determining that the device is at sea on the ship, causing the device to then enter an ocean mode. In the ship mode, the device does not power the GNSS chip for the purpose of detecting its location. In some cases, it may power the GNSS chip to enable the RTK receiver, or may power just the RTK receiver, or may not power the GNSS chip at all. While in ship mode, in some implementations, the device may periodically power the cellular transceiver and may attempt to report location or sensor data on a periodic basis. In the ocean mode, the device does not power the GNSS chip or the cellular transceiver, does not attempt to determine its geolocation using either technology, and does not attempt to obtain a cellular connection to send reports to the central server.

In some implementations, the device determines it is on a ship based on detection of a beacon signal by the short-range communications chip. The short-range beacon signal may be broadcast by a base station on the ship.

To determine that the ship is at sea, the device may base the detection on one or more wireless signals. In one example, the harbour area includes an RTK base-station that broadcasts an RTK correction signal to enable marine traffic and other users to carry out fine GPS location correction. If the asset tracking device detects both the beacon signal indicating it is on a ship and the RTK correction signal, then it determines that it is in port or in the harbour. If it detects the beacon signal and no RTK correction signal, or the loss of an RTK correction signal after having detected one earlier, then it determines that the ship is now at sea, and it enters an ocean mode.

In another implementation, instead of an RTK signal, the on-ship beacon transmitter signals whether the ship is in port or at sea using a flag or other code within the beacon signal. Accordingly, the asset tracking device in this example bases the determination of whether the ship is at sea on a change in the data encoded in the wireless short-range beacon signal transmitted by the on-ship beacon base station. In some cases, the beacon transmitter may use the short range ISM band. In some implementations, the beacon transmitter may be implemented using an A2 or R2 Radar accessory configured for this application.

Figure 3:
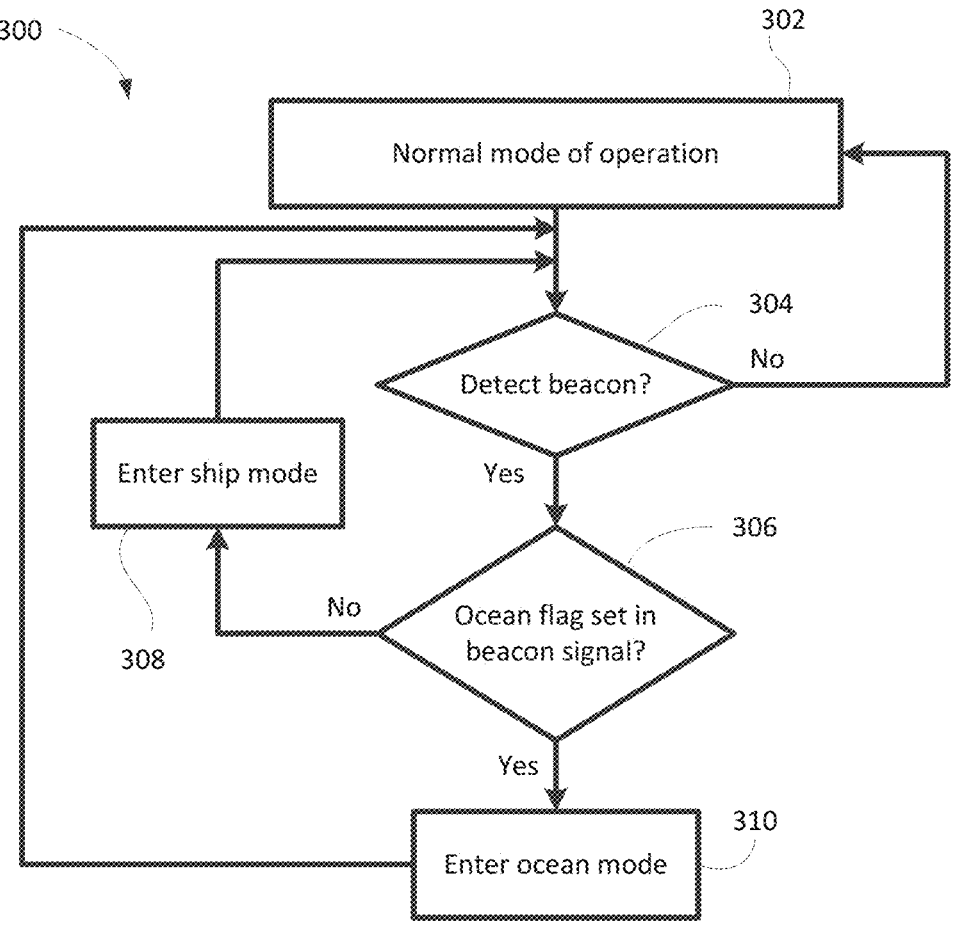
FIG. 3 shows, in flowchart form, a first example method of controlling an asset tracking device in accordance with the present application.

FIG. 3 shows one simplified example of a method 300 of controlling an asset tracking device. The method 300 may be implemented by way of software instructions executed by one or more processors, such as the controller 208 (FIG. 2) within an asset tracking device. The asset tracking device that implements the method 300 includes at least a GNSS chip, a cellular transceiver and a short-range communications chip. In this example method 300, the asset tracking device transitions between a ship mode and an ocean mode on the basis of the on-ship beacon signal. As noted above, the on-ship beacon signal may be a signal broadcast by one or more base-stations on the ship. The base-stations may be within a cargo hold or mounted to a structure proximate the ship deck in some implementations. The base-stations may be Bluetooth™ Low Energy beacons in some examples.

The asset tracking device is configured to operate in a normal mode under most conditions, as indicated by operation 302. In the normal mode, the device is configured to operate in a low-power or sleep most of the time, but to periodically, with a certain prescribed schedule, power up the controller and the GNSS chip to seek satellite signals and determine a geolocation. In some cases, the normal mode may also include taking sensor readings or performing other functions with device electronics. The normal mode also involves periodic reporting to the central server. The reporting frequency may be the same as the geolocation determination frequency, but in many cases, the reporting occurs less frequently than the geolocation determination, such that each location report sent may contain multiple time-stamped geolocations. To send a report, the device powers the cellular transceiver and attempts to obtain a data connection over a mobile data network. Assuming it manages to connect to the mobile network, it transmits one or more location reports to the central server. The device may receive an acknowledgement message in reply and/or other configuration instructions or commands from the central server. The frequency of geolocation determination and/or reporting may change based on the configuration instructions or commands and/or based on whether the device determines that it is in motion or stationary using an inertial measurement unit, such as an accelerometer.

During a wake period, in operation 304, the controller determines whether it detects a beacon signal. The device may use the short-range communications chip to detect the beacon signal. The beacon signal may include a code or other data indicating that it is broadcast by a ship-borne beacon base station. In some cases, the beacon signal may include data regarding the ship, such as a name or other identifier for the ship, its owner, its flag of operation, its current port, its planned travel route or destination, or other such information. In some cases, the beacon signal may only indicate that it is a ship-mounted beacon transmitter without any additional data other than a flag or other code indicating whether the ship is at sea or in port.

In some implementations, detection of the beacon signal in operation 304 includes determining that the beacon signal received signal strength intensity (RSSI) is higher than a set minimum threshold value. If the beacon signal is weak, the device may determine that it is likely located in a shipping yard near a ship, but not actually on a ship.

In operation 306, the device determines whether the beacon signal includes a flag or code indicating that the ship is at sea. If not, then the device may determine that it is in port or in a harbour on board the ship, and it proceeds to operation 308 to enter a ship mode. If the flag or code indicates that the ship is at sea, then the device proceeds to operation 310 to enter an ocean mode.

In some cases, the device will not enter an ocean mode on the basis of a flag or code if the device first detects the beacon signal with that flag set. In other words, the device may require that the beacon signal indicate that it is in port/harbour when it is first detected, since the asset tracking device could not have first been loaded onto the ship while it was at sea. If the beacon is first detected with the "at sea" flag set then the device may determine that there is an error in the code and may stay in a ship mode or revert to normal mode.

When the device enters the ship mode in operation 308, it implements a new operating pattern that excludes use of the GNSS chip to determine geolocation on the basis that it is likely going to be unable to obtain satellite signals due to container stacking or other signal blocking while on the ship. In some cases, the new operating pattern for ship mode may include waking up the controller less frequently than in the normal mode.

The device may still power up the cellular transceiver to seek a cellular data connection in order to report its location and status data while in ship mode; however, in some cases it does not do so or does so less frequently that in the normal mode.

While in ship mode, the controller may also disable or not power up or take readings from inertial measurement units, such as accelerometers, which might otherwise have been used to trigger a more frequency geolocation determination and reporting patterns due to detected movement of the device.

On detecting the flag indicating the ship is at sea in operation 306 and entering ocean mode in operation 310, the device ceases powering up the GNSS chip or the cellular transceiver whenever it awakens. The frequency of awakening from low power operation may also decrease, with the device only awakening every 6 hours, 12 hours, 24 hours, or longer. On awakening, the device powers the short-range communications chip to determine whether it still detects the beacon signal in operation 304 and, if so, whether the beacon signal still indicates that the ship is at sea in operation 306. Once the ship reaches its destination and the beacon signal indicates it is in port once again, the device will revert to ship mode in operation 308. Once the device ceases detecting the beacon signal, then it will assume it has been offloaded from the ship and will revert to normal mode in operation 302.

In some situations, the port area, e.g. the harbour, shipping yard or docklands, may have, or may be proximate to, an RTK base-station. As described above, the RTK base-station broadcasts a correction signal that uses carrier-based ranging and that may be detected and used by GNSS receivers to correct for errors in location determination using satellite signals. In this cases, the device leverages the fact it can see the RTK signal from a port-located RTK base-station as an indicator that it is in or near the port area. The device relies on detecting the correction signal over-the-air, e.g. as an RF signal, typically in the UHF band, as opposed to receiving the correction signal over the Internet or through some other channel.

Figure 4:
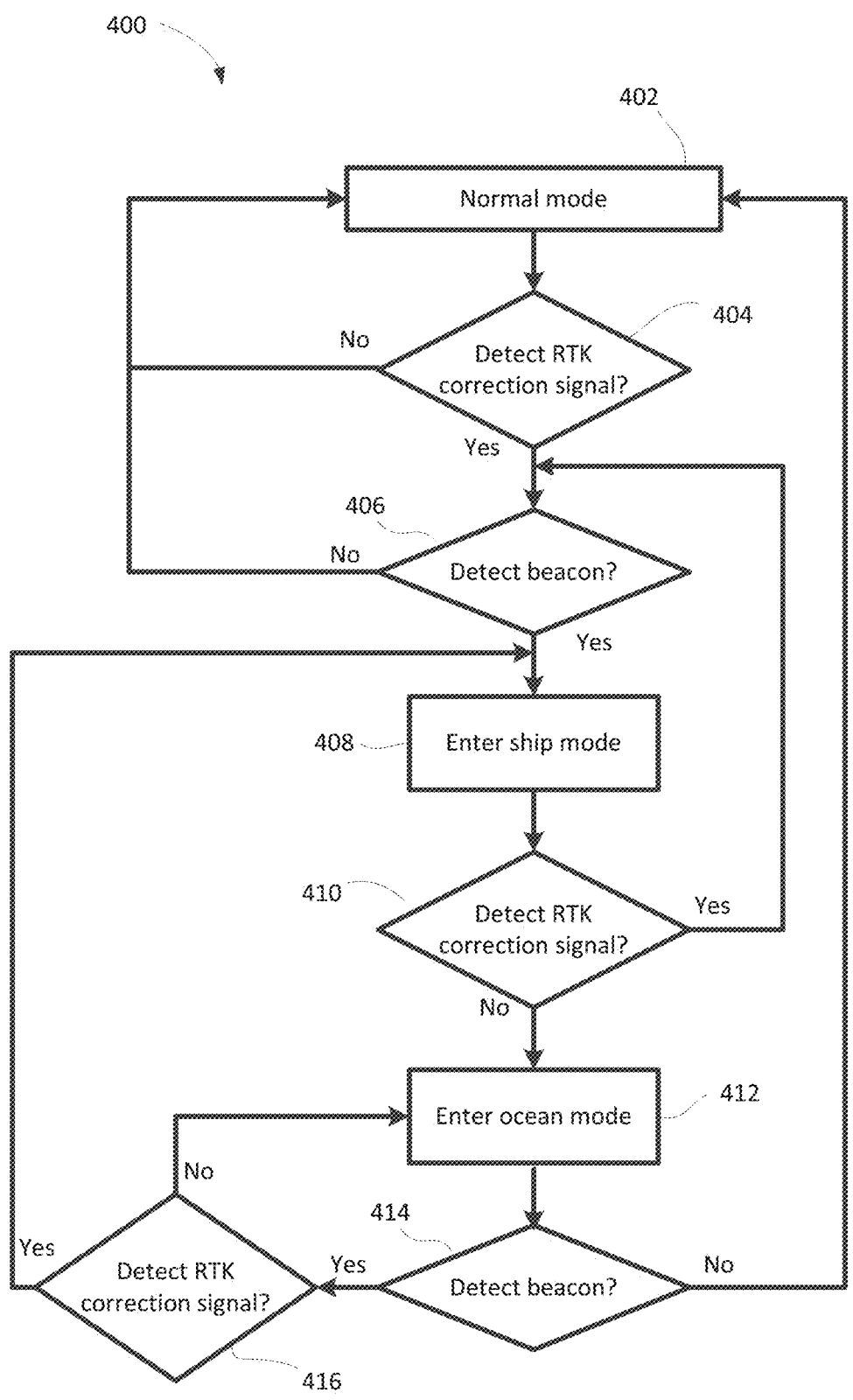
FIG. 4 shows, in flowchart form, a second example method of controlling an asset tracking device in accordance with the present application.

FIG. 4 shows, in flowchart form, one example method 400 for controlling an asset tracking device in part reliant upon receipt of a short range RF signal associated with the port area. In this example, the short range RF signal is a correction signal from an RTK base-station. The correction signal may be formatted in accordance with a version of the RTCM protocol. In some cases, the correction signal may include a base-station identifier, such as a name or alphanumeric identifier for the RTK base-station. The asset tracking device may have a set of RTK identifiers stored in memory and data regarding the locations associated with those identifiers. For example, the asset tracking device may be provided with a set of RTK identifiers specifically associated with shipping ports and the identity of the port or its geolocation for each identifier. The central server may transmit updated RTK identifier data to the asset tracking device from time to time.

Turning to the method 400, in operation 402 the asset tracking device operates in a normal mode. As discussed above, the normal mode may be associated with a prescribed operating schedule and timing for device wake-ups and a certain frequency of operation for determining device location using the GNSS chip and/or cellular triangulation (if GNSS fails to find a location), and for obtaining a cellular data connection in order to send location reports to the central server.

While in the normal mode, the device may assess whether it detects a correction signal from an RTK base-station, as shown in operation 404. The RTK receiver in the device may be part of the GNSS chip in some implementations, may be standalone component, or may be incorporated into another antenna/transceiver package, such as the short-range communications chip or the cellular transceiver. If no correction signal is detected the device may remain in the normal mode of operation 402. In some cases, a correction signal may be detected, but it may contain an RTK identifier that does not correspond to a port location, in which case the device may remain in the normal mode.

If a correction signal is detected, and the RTK identifier in the correction signal corresponds to a port location, then the device may proceed with the method 400, making detection of a port-located RTK signal a trigger for enabling the remainder of the method 400. In operation 406, the device then determines whether it can detect a beacon signal. In particular, the device looks for a ship-mounted beacon signal using its short-range communications chip. The beacon signal may contain an identifier or other code signaling that it relates to an ocean-going vessel. In some cases, the beacon signal may identify the ship with which it is associated.

If no beacon is detected, the device remains in the normal mode and returns to operation 402, where it powers down to wait for a next wake-up cycle, at which point it will again assess whether it sees the correction signal and, if so, whether it detects the beacon signal.

If the device detects the beacon signal in operation 406, then it enters a ship mode in operation 408. As mentioned above, in some implementations, detection of the beacon signal includes detecting the signal with an RSSI above some minimum threshold level to ensure the device is sufficiently proximate the beacon transmitter that it can be presumed to be on board the ship.

As noted above, the ship mode may be associated with depowering of the GNSS chip or, more specifically, not powering up the GNSS chip to try to determine geolocation when the device periodically awakens. In some cases, the ship mode may disabling the cellular transceiver and other device components, such as a motion sensor. In some cases, however, the cellular transceiver may still be periodically powered up to seek a data connection and to send a location report. Because the device is presumably still in port, despite being likely loaded onto a ship, it may still be able to obtain a connection with a cellular mobile data network.

While in ship mode, the device assesses whether it can still detect the RTK correction signal in operation 410. If so, then it may presume that it is still in port, and it returns to operation 406 to assess whether it still sees the beacon signal. Provided it sees both the RTK correction signal and the beacon signal, the device assumes it is loaded on the ship and is still in the port area, whether docked or moored in the harbour.

Once the device can see the beacon signal but can no longer detect the RTK signal, it determines that the ship has left the port area to set sail and the device then enters an ocean mode in operation 412. While in ocean mode, the GNSS chip and the cellular transceiver remain off whenever the device awakens. While it is in the ocean mode, the device may remain in a lower power mode for longer periods of time that it otherwise might. For example, the wake up frequency may lengthen to only wake up the device every 6, 12, 18, or 24 hours. When the device wakes up, it determines, using the short-range communications chip, whether it still sees the beacon signal in operation 414. If so, then it determines whether it detects an RTK correction signal in operation 416. The detection of an RTK correction signal is indicative that the device has arrived, or returned to, a port area. In this regard, the device may compare an identifier in the received RTK correction signal with its stored list of port-associated identifiers to ensure it corresponds to a port area. Once the device identifies a port-associated RTK correction signal it returns to ship mode in operation 408. The RTK correction signal may identify the port at which the ship has arrived and the device may send a location report while in ship mode to signal its arrival at the new port.

If the device is in ocean mode and can no longer detect the beacon signal in operation 414, then it may return to a normal operating mode 402 since some error may have occurred in which the beacon is disabled or the container with the device has been offloaded without detecting arrival at a port with an RTK base-station.

Figure 5:
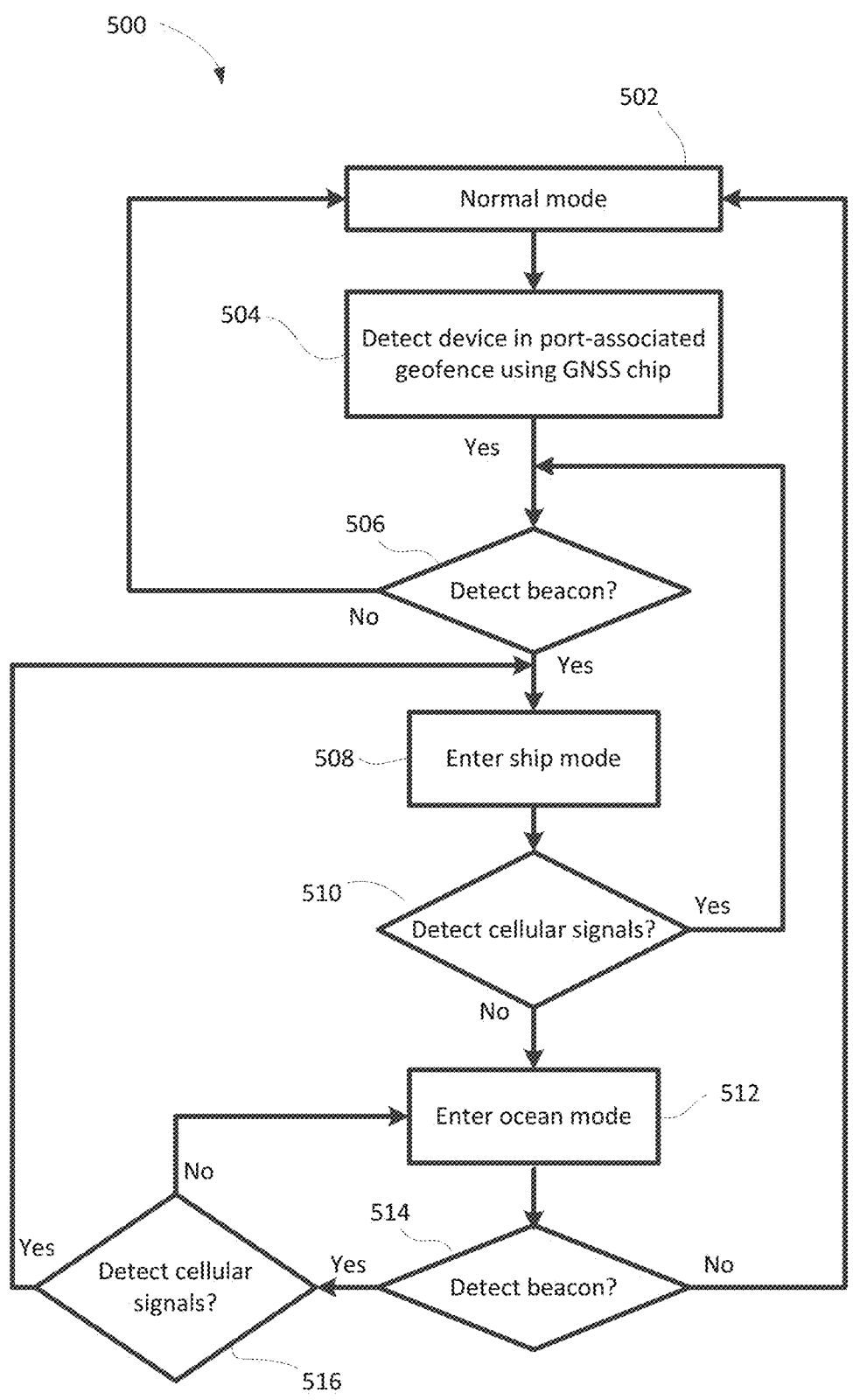
FIG. 5 shows, in flowchart form, a third example method of controlling an asset tracking device in accordance with the present application.

Reference is now made to FIG. 5, which shows another example method 500 of controlling an asset tracking device. This method 500 relies on location detection and cellular signals as a trigger for initiating the process of looking for ocean-travel indicators, instead of an RTK correction signal.

In this method 500, the device operates in its normal mode, as shown by operation 502. In the normal mode, the device periodically obtains satellites signals and determines its geolocation using the GNSS chip. In operation 504, the device determines it has entered a port area on the basis of a defined geofence. The asset tracking device may be provided with a set of geofences defining known port areas or shipping yards, thereby enabling the device to determine when it has entered a potential shipping location. When the device detects its geolocation, the controller may be configured to compare that location to geofence data stored in memory to determine whether the device has entered a geofenced location.

If the geofenced location is defined in the memory as a port location, then the method 500 proceeds to operation 506 where the device determines whether it can detect a ship-mounted beacon signal. As noted above, the determination may include determining that the RSSI of the beacon signal is above a minimum threshold level. The beacon signal may contain a code or other indicator signaling that it's a ship-mounted beacon signal, so as to enable the device to distinguish it from other beacon signals.

If the device detects a beacon signal in operation 506 then it enters the ship mode in operation 508. As noted earlier, this may include ceasing to wake up the GNSS chip to attempt to obtain geolocation data. In some cases, it is associated with a longer sleep time between wake-ups.

In this example, while in ship mode, when the device wakes up it attempts to obtain a cellular signal. As a part of that process, the device determines in operation 510, through the cellular transceiver, whether any mobile network cellular signals can be detected. In other words, it assesses whether it sees any signals broadcast by cellular tower. Provided it can see a cellular signal, even if it cannot obtain a data connection due to the signal strength or due to it being an MNO with which the device does not operate (e.g. a cellular network with which it is not authenticated to use or authorized to access), the device may conclude that the ship is still proximate a port area or close enough to land to be deemed in the harbour. This may include situations in which the ship travels through a canal, or the like, in close proximity to land.

If the device has detected the beacon in operation 506 but does not see any broadcast cellular signals, then it may determine that the ship is now on the ocean, as indicated by operation 512. The device thus enters the ocean mode, in which it still does not power the GNSS chip to try to obtain geolocation data and, additionally, it does not search for a cellular data connection using the cellular transceiver. In this example method 500, the ocean mode may still involve powering the cellular transceiver sufficiently to detect whether the device sees any broadcast cellular signals. As noted earlier, the cycle between wake-ups may be longer in ocean mode than in normal mode, and in some cases may be longer in ocean mode than in ship mode.

In operation 514, on waking up, the device determines whether it still detects the ship-borne beacon signal using its short-range communications chip. If not, then an error or unexpected change may have occurred and the device may be configured to revert to normal mode in operation 502. However, assuming the beacon signal can still be detected, in operation 516 the device then assesses whether it can see any broadcast cellular signals, i.e. if there are any cellular mobile network towers sufficient close that the device can see the signal. In some cases, the device may set a minimum RSSI for a detection to occur. The device may only power up the cellular transceiver in operation 516 to listen and report cellular signals. To conserve power, the cellular transceiver may not perform a full scan. In some cases, the transceiver may be instructed by the controller to only listen using one or one more possible radio technologies, one or more bands, or otherwise constrain its search for signals to a smaller subset of possible signals that it would otherwise do in normal mode.

If the asset tracking device detects a cellular signal, then it returns to operation 508, putting the device back into ship mode. Otherwise, it remains in ocean mode, returns to sleep, and awaits the next wake up time in operation 512.

It will be appreciated that it may be that some or all of the above-described operations of the various above-described example methods may be performed in orders other than those illustrated and/or may be performed concurrently without varying the overall operation of those methods. It will also be appreciated that some or all of the above-described operations of the various above-described example methods may be performed in response to other above-described operations.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Certain adaptations and modifications of the described embodiments can be made. Therefore, the above discussed embodiments are considered to be illustrative and not restrictive.

What is claimed is:

1. A computer-implemented method of operating an asset tracking device, the method comprising:

detecting, at the asset tracking device, using a short-range communication system, a beacon signal broadcast by a base station on a ship;

in response to detecting the beacon signal, entering a ship mode in which the asset tracking device does not determine its location using a global navigation satellite system (GNSS) chip, determining whether the ship is in motion based on data from an inertial measurement unit, setting an interval based on the determination of whether the ship is in motion, and periodically powering a cellular transceiver to seek a mobile network connection according to the interval; and determining, based on whether the asset tracking device detects a real-time kinematics (RTK) correction signal, that the ship is at sea and, in response to determining that the ship is at sea, entering an ocean mode in which the asset tracking device does not determine its location using the GNSS chip and does not power the cellular transceiver to seek a mobile network connection.

2. The method of claim 1, wherein the beacon signal includes an identifier, wherein the detecting of the beacon signal includes comparing the identifier to stored data listing ship-borne beacon identifiers and locating a match, and wherein the interval is decreased in response to detecting that the ship is in motion based on the data from the inertial measurement unit.

3. The method of claim 1, further comprising ascertaining that the asset tracking device is located in a shipping yard but not on the ship, in response to detecting the beacon signal and determining that a received signal strength intensity of the beacon signal is below a minimum threshold level.

4. The method of claim 1, wherein determining that the ship is at sea is based on data in the beacon signal.

5. The method of claim 1, further comprising detecting the RTK correction signal using an RTK receiver, and causing the asset tracking device to use the short-range communication system to look for the beacon signal after detection of the RTK correction signal.

6. The method of claim 5, wherein determining that the ship is at sea includes determining that the RTK receiver no longer detects the RTK correction signal.

7. The method of claim 5, wherein detecting the RTK correction signal includes decoding the RTK correction signal to obtain an RTK base-station identifier, and matching the RTK base-station identifier to an identifier in a set of port-associated RTK base-station identifiers.

8. The method of claim 5, further comprising, after entering the ocean mode, during a subsequent wake-up time:

detecting the beacon signal using the short-range communication system;

detecting a new RTK correction signal using the RTK receiver; and in response to the new RTK correction signal, switching from the ocean mode to the ship mode.

9. The method of claim 8, further comprising, during a further wake up time, attempting and failing to detect the beacon signal using the short-range communication system and, in response, switching the device from the ship mode to a normal mode of operation in which the device uses the GNSS chip to determine its location.

10. The method of claim 1, wherein determining that the ship is at sea includes determining that the device cannot detect any cellular tower signals using the cellular transceiver.

11. The method of claim 1, further comprising first using the GNSS chip to determine a geolocation for the device, determining that the geolocation matches a geofence defined for a port area and, in response, causing the device to use the short-range communication system for detecting the beacon signal.

12. An asset tracking device comprising:

a short-range communication system;

a global navigation satellite system (GNSS) chip;

a cellular transceiver;

a controller; and a memory storing processor executable instructions that, when executed by the controller, cause the controller to:

detect, using the short-range communication system, a beacon signal broadcast by a base station on a ship;

in response to detecting the beacon signal, enter a ship mode in which the asset tracking device does not determine its location using the GNSS chip and periodically powers the cellular transceiver to seek a mobile network connection;

determine, in response to receiving a real-time kinematics (RTK) correction signal, that the ship is at port, wherein the RTK correction signal comprises a base- station identifier:

identify the port by referencing the base-station identifier with data stored in the memory comprising a set of RTK base station identifiers and respective ports associated with the RTK base station identifiers; and determine, in response to ceasing to detect the RTK correction signal, that the ship is at sea and, in response to determining that the ship is at sea, enter an ocean mode in which the asset tracking device does not determine its location using the GNSS chip and does not power the cellular transceiver to seek a mobile network connection.

13. The asset tracking device of claim 12, wherein the beacon signal includes an identifier.

14. The asset tracking device of claim 12, wherein the instructions, when executed, cause the controller to detect the beacon signal by determining that a received signal strength intensity of the beacon signal is above a minimum threshold level.

15. The asset tracking device of claim 12, wherein the instructions, when executed, cause the controller to determine that the ship is at sea is based on data in the beacon signal.

16. The asset tracking device of claim 12, wherein the instructions, when executed, further cause the controller to detect the RTK correction signal using an RTK receiver, and cause the asset tracking device to use the short-range communication system to look for the beacon signal after detection of the RTK correction signal.

17. The asset tracking device of claim 12, wherein, when in the ship mode the asset tracking device powers an RTK receiver to receive the RTK correction signal without powering the GNSS chip.

18. The asset tracking device of claim 12, wherein the data is periodically updated by transmissions from a central server to the asset tracking device.

19. The asset tracking device of claim 16, wherein the instructions, when executed, further cause the controller to, after entering the ocean mode, during a subsequent wake-up time:

detect the beacon signal using the short-range communication system;

detect a new RTK correction signal using the RTK receiver; and in response to the new RTK correction signal, switch from the ocean mode to the ship mode.

20. The asset tracking device of claim 19, wherein the instructions, when executed, further cause the controller to, during a further wake up time, attempt and fail to detect the beacon signal using the short-range communication system and, in response, switch the device from the ship mode to a normal mode of operation in which the device uses the GNSS chip to determine its location.

21. The method of claim 5, further comprising determining that the asset tracking device is in a port or a harbor, in response to detecting both the beacon signal and the RTK correction signal.

22. The method of claim 5, wherein the determining that the ship is at sea comprises determining that the ship is at sea, in response to detecting the beacon signal and determining that the RTK correction signal is not detected.

23. The method of claim 1, wherein the determining that the ship is at sea comprises determining that the ship is at sea, in response to receiving a flag in the beacon signal.

24. The method of claim 6, wherein the RTK correction signal is from an RTK base station at a harbor area.

* * * * *